Figure 1:
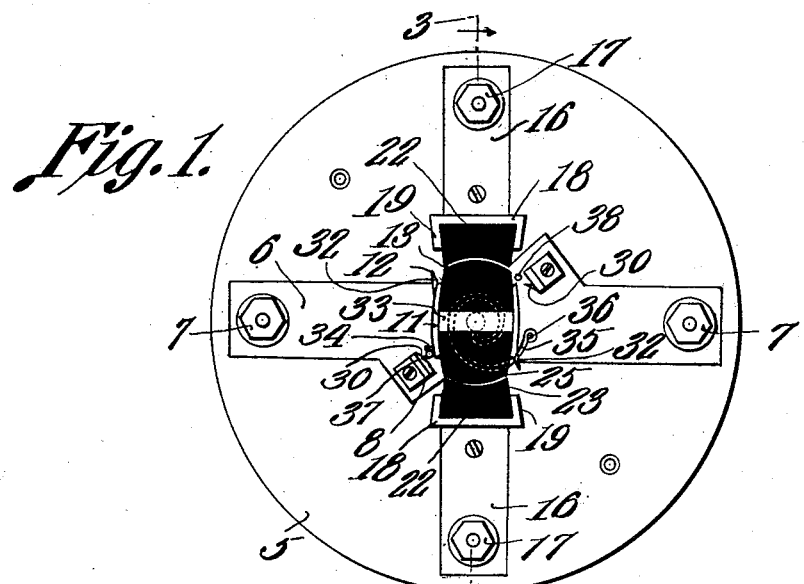

L. T. LINEBERGER.
LIGHTNING ARRESTER.
APPLICATION FILED MAR. 23, 1911.

1,020,429.

Patented Mar. 19, 1912.

Witnesses

Lester T. Lineberger,
Inventor by C. A. Snow & Co.
Attorneys

COLUMBIA PLANOGRAPH CO., WASHINGTON, D. C.

UNITED STATES PATENT OFFICE.

LESTER T. LINEBERGER, OF GASTONIA, NORTH CAROLINA.

LIGHTNING-ARRESTER.

1,020,429.  Specification of Letters Patent.  Patented Mar. 19, 1912.

Application filed March 23, 1911. Serial No. 616,464.

*To all whom it may concern:*

Be it known that I, LESTER T. LINEBERGER, a citizen of the United States, residing at Gastonia, in the county of Gaston and State of North Carolina, have invented a new and useful Lightning-Arrester, of which the following is a specification.

Figure 2:
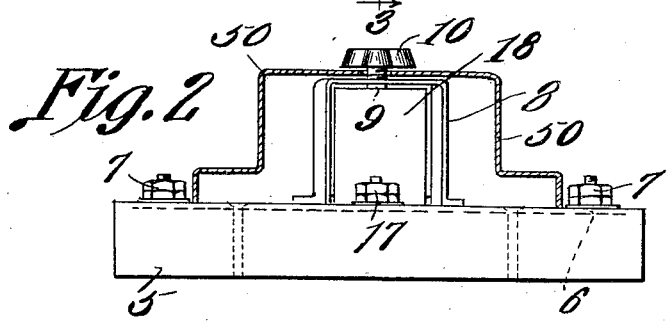
Figure 3:
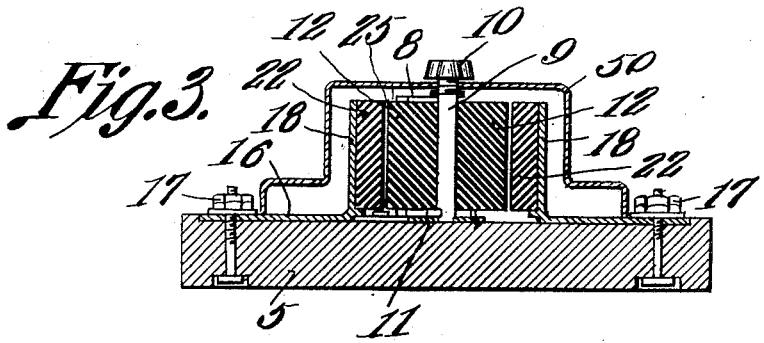

This invention relates to electricity, and more especially to lightning arresters; and the object of the same is to produce a device of this kind, preferably for use on rural telephone systems where the wires are much exposed to lightning, and having means provided by which the carbons may be cleaned from carbon powder or blisters or in fact from any accumulation which might injuriously affect the current. This object is carried out by the construction hereinafter more fully described and claimed, and as shown in the drawings wherein;

Figure 1 is a plan view of my improved lightning arrester with the cap removed. Fig. 2 is an edge elevation thereof taken from the bottom of Fig. 1, and showing the cap in section. Fig. 3 is a central vertical section on the line 3—3 of Fig. 1.

In the drawings, the numeral 5 designates a base of insulating material, herein shown as circular in form, and upon and across the same is secured a flat plate 6 having at its extremities the ground binding posts 7 from which lead wires to the ground in a manner well understood in lightning arresters. Secured to or carried by this plate is the bridge 8 whose center is elevated above the plate and whose body stands preferably obliquely across the plate as indicated in Fig. 1, and journaled in the center of the plate and through the bridge is an upright stem 9 to whose upper end is secured a button 10 in any preferred way, as by the screw threads shown. Secured to the stem by any suitable means, such as by the metallic strip 11, is the ground carbon 12 whose ends 13 are struck on curved lines forming parts of a circle around the center of said stem.

Secured upon the base 5 in a line at right angles to the plate 6 are two other plates 16, each carrying at its outer end a line binding post 17, and it is to be understood that the line wires are connected with these posts in the usual manner. The inner end of each plate 16 is upturned as at 18 and formed with converging jaws 19 between which is clamped the line carbon 22 whose face 23 is struck on a curve of which the center of the stem 9 is the axis, but the circle of this curve is larger than the circle of the curve through the ends 13 of the ground carbon. Therefore there is left between the extremities of the latter and the inner faces of the line carbons an air gap 25, across which of course the lightning will flash as it runs along the line wire, reaches this arrester, and is deflected and conveyed into the earth so that it shall do no harm to the instruments on the line or to the operators who may be using them at the time.

It is well known that after a lightning arrester has once been used, either because the line wire has been struck by lightning or because in some cases it may have come in contact with power wires, there is an accumulation of carbon powder or blisters which more or less completely fill the air gap and therefore deteriorate the current flowing along the line wire, and one of the principal objects of my invention is to remove this accumulation, although it will be well understood that the means which I have devised for doing so will also remove from the air gap any accumulation which may gather therein such as dust or other particles. As the ground carbon is turned aside, its rounded ends 13 pass inside the upright portions of the bridge 8, and on each of said portions is mounted a knife or scraper 30 as best seen in Fig. 1. Carried by the ground carbon are two other knives or scrapers 32 which, in the partial rotation of this carbon, pass across the inner faces 23 of the line carbons 22; and hence a partial rotation of the ground carbon, effected by turning the button 10, simultaneously cleans all faces and removes all sediment or accumulation upon them. In the preferred embodiment of this idea, the knives 32 are formed at the extremities of springs or straps 33 which may well be carried by the strip 11 that incloses the carbon 12. One of said straps 33 carries a stop 34, and 35 here represents a coiled spring secured as at 36 to the plate 6 at one end and at its other end to stem 9 and having a tendency to turn the ground carbon to the left. Finally, 37 and 38 are pins or other projections rising from the plate 6 and so disposed that the tension of the spring 35 will hold the stop 34 normally against the pin 37 as seen in Fig. 1, but when the button 10 is turned to rotate the ground carbon 12 partially the spring will yield or coil up a little more tightly and the stop 34 will pass out of contact with the pin 37 and around the center until it comes into contact with the pin 38. It is intended that these pins shall stand sufficiently remote from each other to permit the ground carbon to be rotated far enough to move its ends 13 across the knives 30 and to move its knives 32 across the inner faces 23 of the line carbons 22.

Thus it will be seen that I have produced a lightning arrester in which the ground carbon stands normally in alinement with the line carbons and yet there are air gaps 25 between their extremities, and in which a partial rotation of the ground carbon by hand and on certain occasions causes a cleansing of both its ends and the inner faces of both the line carbons. As soon as the pressure of the hand is removed, the spring 35 restores all parts to their normal positions with the stop 34 in contact with the pin 37. The metallic cap 50 which usually covers this device may be used or not as preferred.

What is claimed as new is:—

1. In a ligntning arrester, the combination with a base, a ground carbon rotatably supported by said base and having rounded ends, and line carbons carried by said base and having dished inner faces separated from said ends so as to leave air gaps between them; of knives fixedly carried by said base and positioned to scrape the ends of said ground carbon when the latter is turned, other knives carried by said ground carbon and so positioned with respect to its axis that they shall scrape the inner faces of said line carbons when the ground carbon is turned, two spaced pins rising from the base, a stop projecting from said ground carbon and adapted to play between said pins, and yielding means for holding said stop normally in contact with one of said pins when the ground carbon is in alinement with the line carbons.

2. In a lightning arrester, the combination with a base, a ground carbon rotatably supported by said base and having rounded ends, and line carbons carried by said base and having dished inner faces separated from said ends so as to leave air gaps between them; of knives fixedly carried by said base and positioned to scrape the ends of said ground carbon when the latter is turned, other knives carried by said ground carbon and so positioned with respect to its axis that they shall scrape the inner faces of said line carbons when the ground carbon is turned, straps alongside said ground carbon and carrying its knives, one of them having a stop, a strip inclosing said carbon and connecting said straps, pins rising from said base and between which said stop plays, and a coiled spring connected at one end to the base and at the other end to the pivot of said carbon for holding it normally with its stop in contact with one of said pins so that the carbon shall stand in alinement with said line carbons.

In testimony that I claim the foregoing as my own, I have hereto affixed my signature in the presence of two witnesses.

LESTER T. LINEBERGER.

Witnesses:
E. G. McLurd,
M. L. Cornwell.

Copies of this patent may be obtained for five cents each, by addressing the "Commissioner of Patents, Washington, D. C."